(12) United States Patent
An et al.

(10) Patent No.: US 10,858,187 B1
(45) Date of Patent: Dec. 8, 2020

(54) SELF-DRIVEN ROBOT

(71) Applicant: BEIJING GEEKPLUS TECHNOLOGY CO., LTD., Beijing (CN)

(72) Inventors: Bin An, Beijing (CN); Langlang Sun, Beijing (CN)

(73) Assignee: Beijing Geekplus Technology Co., Ltd., Beijing (CN)

( * ) Notice: Subject to any disclaimer, the term of this patent is extended or adjusted under 35 U.S.C. 154(b) by 42 days.

(21) Appl. No.: 16/472,844

(22) PCT Filed: Jul. 12, 2018

(86) PCT No.: PCT/CN2018/095445
§ 371 (c)(1),
(2) Date: Jun. 21, 2019

(87) PCT Pub. No.: WO2019/015526
PCT Pub. Date: Jan. 24, 2019

(30) Foreign Application Priority Data

Jul. 18, 2017 (CN) .......................... 2017 1 0587598

(51) Int. Cl.
*B65G 1/04* (2006.01)
*B65G 35/00* (2006.01)
(Continued)

(52) U.S. Cl.
CPC ........... *B65G 1/0492* (2013.01); *B65G 35/00* (2013.01); *G05D 1/0242* (2013.01);
(Continued)

(58) Field of Classification Search
CPC .................. B65G 1/0492; B65G 35/00; B65G 2203/0283; B65G 2203/042; G05D 1/0246; G05D 1/0255; G05D 1/0242; G06K 7/1413; G06K 7/1417; B60K 17/043; B60K 17/14; G05B 2219/40233
(Continued)

(56) References Cited

U.S. PATENT DOCUMENTS 4,787,499 A * 11/1988 Lodi ....................... B65B 35/56
198/407
9,102,055 B1 * 8/2015 Konolige ................ G06T 7/593
(Continued)

FOREIGN PATENT DOCUMENTS

| CN | 1796058 A | 7/2006 |
| CN | 103482317 A | 1/2014 |

(Continued)

OTHER PUBLICATIONS

International Search Report and Written Opinion dated Aug. 31, 2018, regarding PCT/CN2018/095445.

*Primary Examiner* — Michael Collins
(74) *Attorney, Agent, or Firm* — Arent Fox LLP (57) ABSTRACT

A self-driven robot includes a vehicle body, a driving mechanism, a controlling mechanism and an overturning mechanism. The driving mechanism and the overturning mechanism are disposed on the vehicle body. The driving mechanism is configured to drive the vehicle body to move. And the controlling mechanism is configured to control the overturning mechanism to overturn when the vehicle body moves to a specified position.

19 Claims, 5 Drawing Sheets

(51) Int. Cl.
*G05D 1/02* (2020.01)
*G06K 7/14* (2006.01)
*B60K 17/04* (2006.01)
*B60K 17/14* (2006.01)

(52) U.S. Cl.
CPC ......... *G05D 1/0246* (2013.01); *G05D 1/0255* (2013.01); *G06K 7/1413* (2013.01); *G06K 7/1417* (2013.01); *B60K 17/043* (2013.01); *B60K 17/14* (2013.01); *B65G 2203/0283* (2013.01); *B65G 2203/042* (2013.01); *G05B 2219/40233* (2013.01)

(58) Field of Classification Search
USPC .................................................. 700/213–230
See application file for complete search history.

(56) References Cited

U.S. PATENT DOCUMENTS

| | | | |
|---|---|---|---|
| 2013/0214498 A1* | 8/2013 | DeFazio | B62D 61/10 280/5.28 |
| 2016/0368149 A1* | 12/2016 | Inaba | B25J 5/007 |
| 2017/0273528 A1* | 9/2017 | Watanabe | A47L 9/009 |
| 2019/0366556 A1* | 12/2019 | Wang | B22D 37/00 |

FOREIGN PATENT DOCUMENTS

| | | |
|---|---|---|
| CN | 203753960 U | 8/2014 |
| CN | 106514670 A | 3/2017 |
| CN | 107352205 A | 11/2017 |
| JP | 2014006833 A | 1/2014 |
| JP | 2015067244 A | 4/2015 |
| KR | 20130000243 A | 1/2013 |
| WO | 2013073391 A1 | 4/2015 |

* cited by examiner

SELF-DRIVEN ROBOT

CROSS REFERENCE TO RELATED APPLICATIONS

This is a U.S. National Stage Application, filed under 35 U.S.C. 371, of International Patent Application No. PCT/CN2018/095445, filed on Jul. 12, 2018, which claims priority to Chinese Patent Application No. 201710587598.2 filed on Jul. 18, 2017, the disclosures of which are incorporated herein by reference in their entirety.

TECHNICAL FIELD

The present disclosure relates to a technical field of goods carrying, for example, to a self-driven robot.

BACKGROUND

The rapid growth of the logistics industry has led to a substantial increase in the storage and sorting workload in many logistics companies. At present, the automation of many warehouses is low, and a large number of people are required to complete the selection and delivery of goods manually, which is not only inefficient, but also leads to high logistics costs.

SUMMARY

The present disclosure provides a self-driven robot which can be used in goods sorting.

The self-driven robot, used for sorting goods, includes a vehicle body, a driving mechanism, a controlling mechanism and an overturning mechanism. The driving mechanism and the overturning mechanism are disposed on the vehicle body. The driving mechanism is configured to drive the vehicle body to move. The controlling mechanism is configured to control the overturning mechanism to overturn when the vehicle body arrives at a specified position.

The self-driven robot provided by the present disclosure can increase the goods sorting efficiency and reduce labor costs.

DETAILED DESCRIPTION

The present disclosure is described in conjunction with the accompanying drawings and embodiments.

Figure 1:
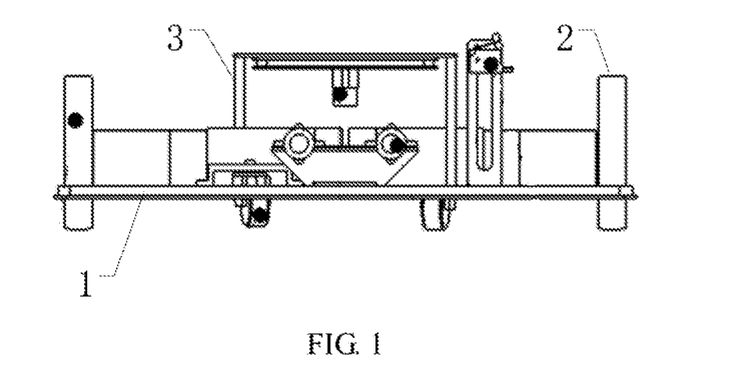
FIGS. 1 to 2 are front views of a robot according to an embodiment.
Figure 2:
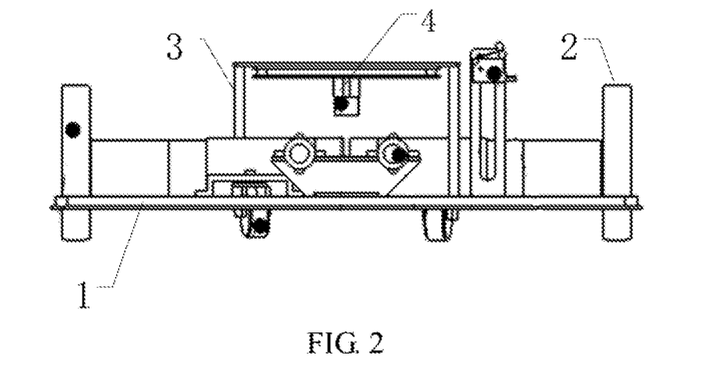

Embodiments provide a robot. For example, the robot may be used for carrying the goods, may be a transport robot or a self-driven robot. FIGS. 1 to 2 are front views of a robot according to an embodiment. Referring to FIG. 1, the robot includes a vehicle body 1, a driving mechanism 2, a controlling mechanism and an overturning mechanism 3. The driving mechanism 2 and the overturning mechanism 3 are disposed on the vehicle body 1. The controlling mechanism may be disposed on the vehicle body or on another structure disposed on the vehicle body (not illustrated). For example, the controlling mechanism may also be disposed on the driving mechanism 2 or the overturning mechanism 3. The driving mechanism 2 is configured to drive the vehicle body 1 to move. The controlling mechanism is configured to control the overturning mechanism 3 to overturn when the vehicle body arrives at a specified position. The self-driven provided by the embodiments can increase the transport efficiency of the goods and reduce labor costs.

In an embodiment, the controlling mechanism is configured to receive an initial drive signal, and control the driving mechanism to drive the vehicle body 1 to move towards the specified position when the controlling mechanism receives the initial drive signal. In practical use, the initial drive signal may be given by a people. For example, an operator sends the initial drive signal to the controlling mechanism via a remote controller. In this case, the controlling mechanism, for example, includes a receiving unit used for receiving the initial drive signal. The initial drive signal may be sent to the receiving unit of the controlling mechanism in a wired or wireless mode. The controlling mechanism controls the driving mechanism 2 to start working when receiving the initial drive signal. A possible implementation method is that a solenoid valve is disposed at a switch between the driving mechanism 2 and a power supply.

The driving mechanism 2 makes the solenoid valve be powered when receiving an electrical signal of the controlling mechanism, and the solenoid valve attracts the pole of the switch, such that the switch is changed into a conductive state. In this way, the driving mechanism is connected to the power supply and the vehicle body 1 is driven to move.

The robot provided in this embodiment may be provided with an internal storage battery which is taken as the power supply, or the robot may be connected to an external power supply. The power supply is used for supplying power for the controlling mechanism, the driving mechanism 2 and the overturning mechanism.

Referring to FIG. 2, in an embodiment, the robot further includes a detecting mechanism 4. The detecting mechanism 4 is configured to detect a position of the vehicle body 1, and send detected position information to the controlling mechanism. The controlling mechanism is further configured to control the driving mechanism 2 to stop driving the vehicle body 1 when receiving information that the vehicle body 1 arrives at the specified position. To make the detecting mechanism 4 detect the specified position more accurately, the detecting mechanism 4 may be disposed in the front end of the vehicle body 1 in the moving direction of vehicle body 1, and for example, the detecting mechanism 4 is disposed on a central axis of the vehicle body 1 in the moving direction.

For example, the detecting mechanism 4 may include at least one of an infrared sensor, an ultrasonic sensor, or a camera.

In a case where the detecting mechanism 4 includes the camera, the position detection process can be performed according to the steps described below. The camera captures a lower front image of the vehicle body 1 and sends captured image information to the controlling mechanism. The controlling mechanism compares the captured image information with target position image information, controls the driving mechanism 2 to stop driving the vehicle body 1 when the image information is in accordance with the target image information, and controls the overturning mechanism 3 to overturn.

It is to be noted that if the area of the target position of the goods is large, with the increase of the goods amount, an original target position image will continually change. In some embodiments, the controlling mechanism may include an updating module. The updating module continually updates a stored target position image based on latest images captured by the camera to ensure an accurate detection to the target position by the detecting mechanism 4. For example, when the robot places the goods in the target position for the first time, the camera can transmit an image of first carried the goods to the controlling mechanism. The controlling mechanism updates the previously stored image. That is, the target position placed with the goods is updated into a new target position. Additionally, an image processor may also be disposed in the controlling mechanism. The image processor may compare the target position image received later with a pre-stored image and automatically exclude newly added goods in the target position image to ensure an accurate positioning.

As described above, in this embodiment, the camera is disposed on the central axis of the vehicle body 1 in the moving direction. To ensure the detection range and accuracy, for example, the camera may be disposed at a height 0.5-1 meters from the ground. Additionally, an angle between the camera and a gravity direction may be within a range of 30°-60° and a shooting section of the camera faces the ground in front of the camera, so that the camera has a sector scanning area in front of the vehicle body 1.

In this embodiment, the camera may include at least one of a two-dimensional code scanning module or a bar code scanning module. The two-dimensional codes or bar codes may be pasted by the constructor in the target positions of the goods to be stored, and the camera can scan the ground at any time, so that when the camera scans these two-dimensional codes or bar codes, position information can be resolved and fed back to the controlling mechanism, and the controlling mechanism starts the overturning mechanism 3 to unload the goods. A possible case is that the controlling mechanism firstly controls the vehicle body to move towards the target position. That is, the vehicle body travels along a direction which basically coincides with a target direction. In this process, the camera continuously scans the goods storage positions in front, and sends signals to the controlling mechanism when the camera scans and resolves such as two-dimensional code information, so that the controlling mechanism can stop the moving of the vehicle body and start the overturning mechanism 3.

For example, the two-dimensional code or bar code may be pasted near a center of the target position so that more goods can be stored in the target position and misplacement is prevented. Additionally, two-dimensional code information or bar code information may include a number representing the storage position, such as a No. 1 storage area, a No. 2 storage area . . . . After the camera sends scanned information to the controlling mechanism, the controlling mechanism can drive the vehicle body to move to a corresponding storage area according to preset position information, so that the robot can identify the target storage position more clearly, and achieve classified goods storage.

Figure 3A:
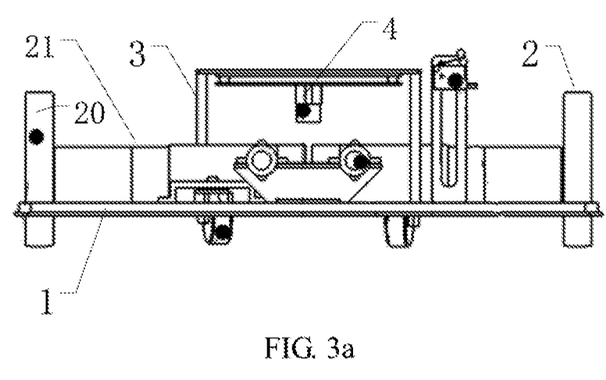
FIG. 3a is a front view of a robot according to an embodiment.
Figure 3B:
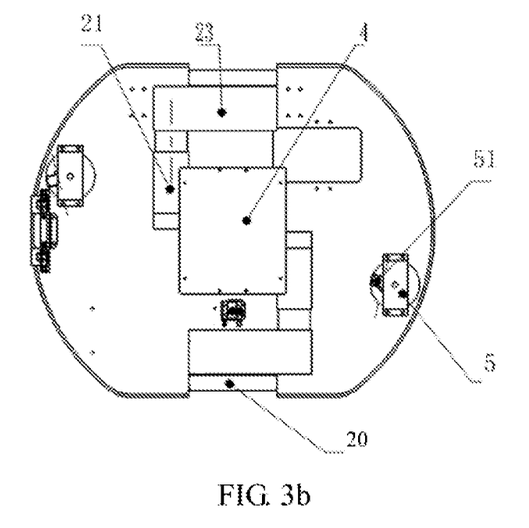
FIG. 3b is a top view of a robot according to an embodiment.

FIG. 3a is a front view of a robot according to an embodiment. FIG. 3b is a top view of a robot according to an embodiment. Referring to FIGS. 3a and 3b, in an embodiment, the driving mechanism 2 at least includes a driving wheel 20 and a driving motor 21 connected to the driving wheel 20. The driving motor 21 is configured to drive the driving wheel 20 to rotate so as to drive the vehicle body 1 to move. For example, the driving wheel 20 is disposed on a side near the ground when the vehicle body 1 normally travels. For example, the driving motor 21 may be disposed on a side facing away from the ground when the vehicle body 1 normally travels. A housing of the driving motor 21 may be fixed to the vehicle body 1 via a bolt, a rotating section of the driving motor 21, for example, may be connected to the driving wheel 20 via a shaft, thereby driving the driving wheel 20 to rotate and the vehicle body 1 to move when the driving motor 21 is connected to a power supple and the rotating section rotates. Additionally, the driving motor 21 may also be connected to the driving wheel 20 via a reducer 23, so that the vehicle body 1 is better driven.

In this embodiment, to make the vehicle body travel more smoothly, the composition and disposition mode of the driving wheel 20 may be adjusted. For example, the driving mechanism 2 may include a first driving wheel, a second driving wheel, a reducer 23, two driving motors connected to the first driving wheel and the second driving wheel separately via the reducer 23. Two driving wheels can make the vehicle body 1 move more flexibly and smoothly. Referring to FIG. 3a, the driving mechanism 2 includes two driving wheels disposed on a left side and a right side of the vehicle body 1 along a width direction. The two driving wheels are pivotally disposed in the middle of the vehicle body 1 in a moving direction (the moving direction means a direction that the vehicle body normally travels forwards) and deployed on two sides of the vehicle body along the width direction. The driving mechanism further include two driving motors, each of the two driving motors is connected to a respective one of the two driving wheels via the reducer 23 to control rotation direction and speed of the corresponding driving wheel. The change of the rotation direction and speed of the driving wheel brings about a change in the moving direction and speed of the vehicle body 1. For example, when the two driving wheels on the left side and the right side of the vehicle body have opposite rotation directions and the same rotation speed, the vehicle body 1 can rotate with respect to an axis X to achieve a direction turning of the vehicle body 1. Through such configuration, the moving direction and moving speed of the vehicle body can be flexibly and smoothly changed, and the vehicle body 1 can move rapidly to a target position. The robot provided by this embodiment and with the above disposing positions of the two driving wheels can make the vehicle body rotate in situ when the two driving wheels have the opposite rotation direction and the same rotation speed, thereby increasing the turning speed of the vehicle body and goods carrying efficiency.

Figure 4A:
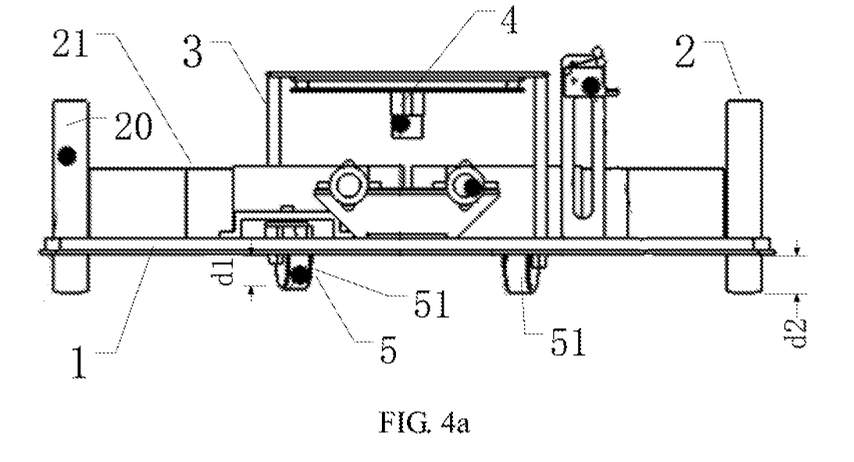
FIG. 4a is a front view of a robot which includes a steering mechanism according to an embodiment.
Figure 4B:
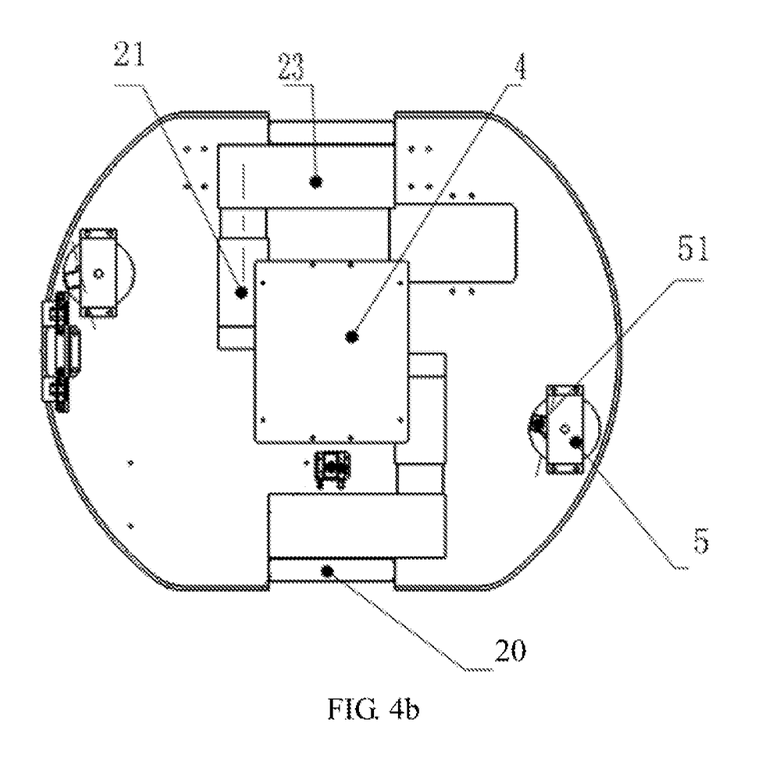
FIG. 4b is a top view of a robot according to an embodiment.

Referring to FIGS. 4a and 4b, in an embodiment, the robot further includes a driven mechanism 5. The driven mechanism includes a universal wheel 51 disposed on the same side as the driving wheel 20 on the vehicle body 1. For example, the universal wheel 51 may be two. Two universal wheels may be pivotally disposed respectively on a front end and a back end along the moving direction of the vehicle body. For example, the two universal wheels may be respectively disposed in front of and behind the driving wheel (assuming that the front end of vehicle body along the moving direction is the front). That is, one universal wheel 51 is close to the front end of the vehicle body, another universal wheel is close to the rear end of the vehicle body. In an embodiment, a distance between the two universal wheels may be slightly greater than a distance between the two driving wheels, so that the turning of the vehicle body is more stable and the vehicle body 1 is prevented from falling to one side. For example, the distance between the two universal wheels 51 is 1.2 to 1.5 times of the distance between the two driving wheels, thereby improving the turning effect of the vehicle body 1.

Referring to FIG. 4a, in this embodiment, for example, in the two universal wheels 51, a first distance d1 between a side of one universal wheel 51 away from the vehicle body 1 (that is, a part farthest from the vehicle body 1) and the vehicle body 1 is not equal to a second distance d2 between a side of another universal wheel 51 (a part farthest from the vehicle body 1) and the vehicle body. That is, when the vehicle body is placed on the ground in an upside down manner, at least one universal wheel 51 is not in a plane formed by another universal wheel 51 and the driving wheels. As shown in FIG. 4a, the universal wheel 51 the distance between which and the vehicle body 1 is d1 is not in the plane mentioned above. For example, in a case where the part farthest from the vehicle body 1 in another universal wheel 51 and a part of the driving wheel 20 farthest from the vehicle body 1 are in a same plane, a part of the at least one universal wheel 51 farthest from the vehicle body 1 is between a side of the vehicle body near the ground (when the vehicle is placed on the ground normally) and the above-mentioned plane formed by another universal wheel 51 and the driving wheels. For example, the first distance d1 and the second distance d2 satisfy d1=(90%~98%)×d2. With such configuration in which at least one universal wheel 51 is not in the plane formed by another universal wheel 51 and the driving wheels, the distance relationship between different universal wheels 51 and the vehicle body are further adjusted, and the turning effect of the vehicle body can be improved and the vehicle body 1 is prevented from rollover when the vehicle body 1 is turning.

In some embodiments, for example, multiple universal wheels 51 are disposed at the same side of the vehicle body where the driving wheels are disposed. For example, the multiple universal wheels 51 may include the universal wheels 51 disposed on the front end and the universal wheels 51 disposed on the rear end of the vehicle body. By disposing the multiple universal wheels 51, and optimizing the positions of the universal wheels 51 as well as the relationship between the universal wheels 51 and the driving wheels, the turning effect of the vehicle body can be improved.

In the above-mentioned embodiment, the vehicle body 1 may also include a telescopic device connected to the universal wheel 51. The telescopic device is configured to make the universal wheel 51 stowed or in-place. And when the universal wheel 51 is at the stowed position, the universal wheel 51 is stowed to the vehicle body 1, so the universal wheel 51 does not participate in the turning of the vehicle body 1. When the universal wheel 51 is at the in-place position, the universal wheel is extended in the direction away from the vehicle body 1 so the universal wheel 51 participates in the turning of the vehicle body 1. In an embodiment, the telescopic device, for example, may be a pin shaft or a hydraulic rod structure. When the telescopic device is the pin shaft, a housing of the universal wheel 51 may be connected to the vehicle body via the pin shaft and an external shaft sleeve. For example, the pin shaft may include a positioning hole disposed along a length direction of the pin shaft. The shaft sleeve includes two openings disposed along the length direction of the shaft sleeve and used for coordinating with the positioning hole. When the pin shaft fully coordinates with the shaft sleeve (that is, in a case that the pin shaft is inserted into the shaft sleeve in a maximum extent), the positioning hole of the pin shaft matches one of the openings of the shaft sleeve, and the universal wheel 51 is in working position. Meanwhile, when the positioning hole of the pin shaft matches the other opening of the shaft sleeve, the universal wheel is in the stowed state. In some application cases, for example, when there is an obstacle on the ground, or when the vehicle body is on a slope or on an uneven ground, the number of the universal wheels in the working state can be adjusted accordingly, so that the number of the universal wheels is adapted to the ground condition, increasing the moving speed of the vehicle body while ensuring a stable turning.

In some embodiments, the reducer may be a worm gear, a planet gear reducer, a helical gearing, may also be self-made mechanical apparatus with a reducing function, such as a synchronous belt or a chain. The above-mentioned driving motor may be directly connected to a right-angle reducer. With the reducer, while the speed is reduced, an output torque is increased and load inertia is reduced, thereby improving the working performance of the driving mechanism.

Figure 5A:
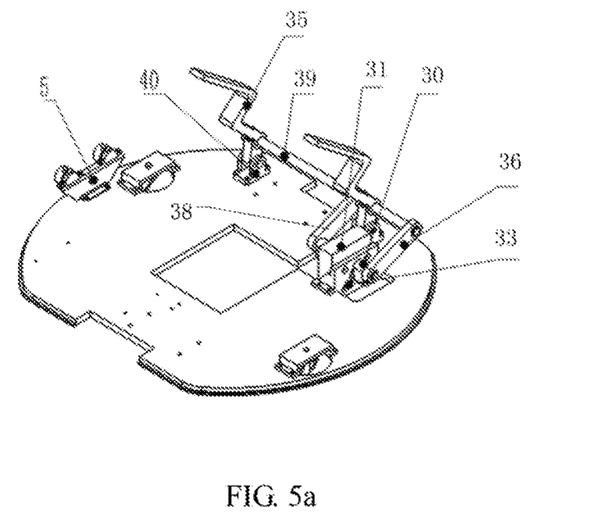
FIGS. 5a and 5b are top views of a robot having an overturning mechanism according to an embodiment.
Figure 5B:
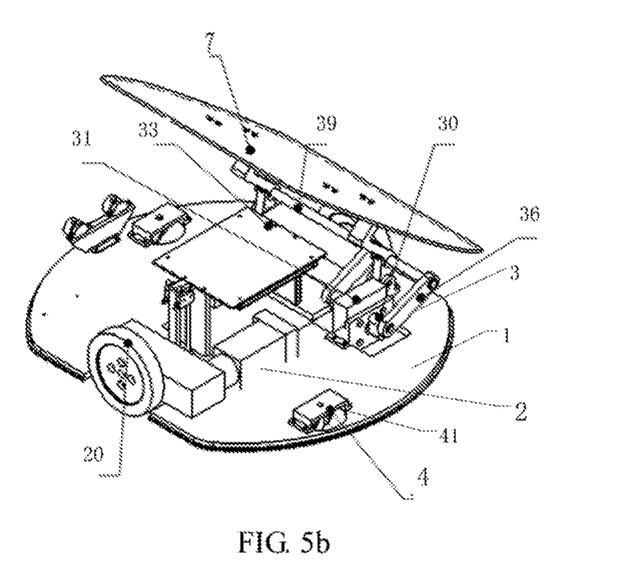

Referring to FIGS. 5a and 5b, in an embodiment, a side of the vehicle body 1 is provided with a first mounting base 40 and a second mounting base 33. The overturning mechanism 3 includes an overturning motor 31 fixed to the second mounting base 33, a first crank 30 connected to a first output shaft of the overturning motor 31, a first connecting rod 36 connected to the first crank 30 via a pin shaft, a rocker 35 rotationally connected to the first mounting base 40, and a transmission shaft 39 fixedly connected to the rocker 35. The first connecting rod 36 is fixedly connected to the transmission shaft 39 so that the first crank 30 rotates when the overturning motor 31 rotates and drives the first connecting rod 36 to move. The first connecting rod 36 drives the rocker 35 to swing via the transmission shaft 39. The overturning motor 31 transfers the rotating motion to the rocker 35 via the first crank 30, the pin shaft and the first connecting rod 36, so that the rocker 35 and the overturning motor 31 rotate in a same direction and the safety unloading can be achieved.

In the above-mentioned embodiment, for example, a rotation direction of the rocker 35 is the same as a rotation direction of the first connecting rod 36. Referring to FIG. 5a, for example, the first mounting base 40 includes two fixed plates along a direction which basically coincides with a direction of the first output shaft of the overturning motor 31. Each of the two fixed plates includes an opening, and a direction of a line that connects centers of two openings is coincides with the direction of the first output shaft of the overturning motor 31. The pin shaft passes through the two openings, and an end of the rocker 35 is outside the pin shaft and tacked, and the rocker 35 is rotatable relative to the pin shaft. That is, such structure enables that the rotation direction of the rocker 35 is the same as the rotation direction of the first output shaft of the overturning motor. Additionally, as shown in FIG. 5a, the direction of the first output shaft of the overturning motor 31 may basically coincide with the moving direction of the vehicle body. However, it is to be understood by those skilled in the art that the direction of the first output shaft of the overturning motor 31 may be other directions.

Referring to FIG. 5a, the overturning mechanism may also be a double connecting rod mechanism. In an embodiment, the second mounting base 33 is fixed to the vehicle body 1, for example, the second mounting base is connected to a side of the vehicle body by a screw thread. The overturning motor 31 is fixed to the second mounting base 33 and has two output shafts each of which is connected to a respective one of two rockers, and the two rockers are connected to a first connecting rod 36 and a second connecting rod 38 respectively via pin shafts. Specifically, output shafts of the overturning motor 31 protrude out from two ends of the overturning motor 31 respectively, and are basically parallel the moving direction of the vehicle body. The first connecting rod 36 and the second connecting rod 38 are connected to the output shafts in two sides of the overturning motor 31 by the pin shafts and rockers, thereby forming the double connecting rod structure. The first mounting base 40 and the above-mentioned second mounting base 33 are fixed to a same side of the vehicle body 1. The rocker 35 is fixed on the first mounting base 40 and rotates around a central axis of the first mounting base 40. The rocker 35 is fixedly connected to the transmission shaft 39 and the transmission shaft 39 protrudes out towards connecting rods. An end of the first connecting rod 36 and an end of the second connecting rod 38 are fixedly connected to the transmission shaft 39 respectively. In this way, when the overturning motor 31 works, the first connecting rod 36, the second connecting rod 38 and the overturning motor 31 rotate together, thereby driving the transmission shaft 39 to rotate, so that the transmission shaft 39 drives the rocker 35 to rotate, and a function of goods overloading is achieved. Additionally, with the connecting rods connected to the transmission shaft on the two sides of the overturning motor, the stability of the overturning can be improved, the mechanical properties of the overturning mechanism can be improved, and the accuracy of the overturning operation can be improved.

In an embodiment, for example, the connection mode between the two connecting rods and the transmission shaft may also be configured. For example, the two connecting rods are the first connection rod 36 and the second connecting rod 38 respectively. Optionally, in a case where the overturning motor 31 is connected to the transmission shaft 39 via two connecting rods, for example, an end of the first connecting rod 36 away from the first crank 30 includes a first shaft hole, and an end of the second connecting rod 38 away from the second crank includes a second shaft hole. The transmission shaft 39 is fixedly connected to the first connecting rod 36 and the second connecting rod 38 by passing through the first shaft hole and the second shaft hole. For example, an interference fit is adopted between shaft holes and the transmission shaft 39. That is, the size of the shaft hole is less than the size of the transmission shaft 39, so that the connecting rods are fixed connected with the transmission shaft, thereby ensuring that the transmission shaft 39 rotates along with the connecting rods. Additionally, to improve transmission effect and improve the stability of the transmission structure, regions of the transmission shaft 39 where the transmission shaft 39 and the connecting rod match are each provided with a screw thread hole, so that after the transmission shaft 39 passes through the shaft holes, the transmission shaft 39 is fixed connected to the connecting rods via bolts.

As shown in FIG. 5b, in the above mentioned embodiment, for example, an end of the rocker 35 may be provide with a tray 7. The tray may be used for carrying the goods. For example, when the vehicle body 1 is placed on the ground normally and the overturning motor 31 is not working, the tray 7 is basically in a horizontal state. When the vehicle body 1 arrives at a specified unloading position, the overturning motor 31 rotates, so that the rocker 35 rotates along with the overturning motor 31 by means of the above-mentioned mechanism, causing a certain angle between the tray 7 and the ground, so that the goods slide from the tray 7 and are unloaded. The robot provided by the embodiment may include the tray 7, or may not include the tray. In an embodiment in which the robot does not include the tray, the end of the rocker 35 may include a carrying structure where the tray is placed, for example, the structure may be a support frame structure or a circle accommodating structure, etc.

In an embodiment, to ensure that the tray 7 is kept in a horizontal position by the rocker 35 when the robot is transporting goods, the rocker 35 may include a reset mechanism. The reset mechanism may be a spring or a torsion spring. With the reset mechanism, the rocker 35 is in a position keeping the tray 7 in the horizontal state. In this case, when the overturning motor 31 works, the rocker 35 may overcome a restoring force of the reset mechanism, and slopes to a side (such as the front of the moving direction of the vehicle body), so that the tray 7 connected to the rocker 35 slopes, achieving the goods unloading. When the overturning motor 31 is shutdown, the rocker 35 may make the overturning motor to the original position via the force of the reset mechanism, so that the tray is basically maintained in the horizontal state.

In an embodiment, in a case where the reset mechanism is the spring, the reset mechanism can be configured using the following method. An end of the spring is fixed on the first mounting base 40, another end pulls the rocker 35, and the spring, for example, is in a stretched state. When the rocker 35 is in a limiting position (that is, the tray 7 is in the horizontal state), the rocker 35 cannot rotate in a direction opposite to the rotation direction of the overturning motor. For example, a stopper member may be disposed at a movement limiting position of the rocker 35 in the opposite direction. The stopper member may be fixed connected to the first mounting base 40 or the vehicle body 1. The rocker 35, under a double action of a stretched force of the spring and the stopper member, is in close contact with the stopper member with a certain force, and applies a force to the stopper member in the opposite direction of the rotation direction of the overturning motor 31. When the rocker 35 is in this position, the tray 7 may substantially be in the horizontal state to facilitate placing and carrying the goods. That is, when the rocker 35 is not subjected to external force, the rocker is substantially in the horizontal state. When the overturning motor 31 rotates, a torsion force is passed to the rocker 35 via the connecting rods and the transmission shaft 39, so that the rocker 35 overcomes the stretched force of the spring and rotates in a same direction with the overturning motor 31. When the overturning motor 31 stops working, the rocker 35, under an action of the tension force of the spring, returns to its movement limiting position in the opposite direction. That is, the tray 7 is substantially in the horizontal position.

In this embodiment, to ensure that the goods are completely unloaded, the overturning mechanism may further include a detecting claw connected to the controlling mechanism. After the overturning mechanism overturns correctly, the overturning mechanism sends an in-place signal to the controlling mechanism. After the controlling mechanism receives the in-place signal, the controlling mechanism transmits a working signal to the detecting claw. The detecting claw is changed from a folded state to an opened state according to the received working signal, and lightly touch the tray carrying goods with the front end of the detection claw. If a foreign object other than the tray is touched, it is determined that the goods are not unloaded completely. The foreign object is clamped by fingerlike parts of the front end of the detection claw, and the fingerlike parts release the foreign object after the foreign object is outside the tray, so that the goods fall to the unloading area. If the foreign object other than the tray is not touched, it is determined that the goods are unloaded completely, and a folding mechanism is started to reset the detecting claw.

Figure 6A:
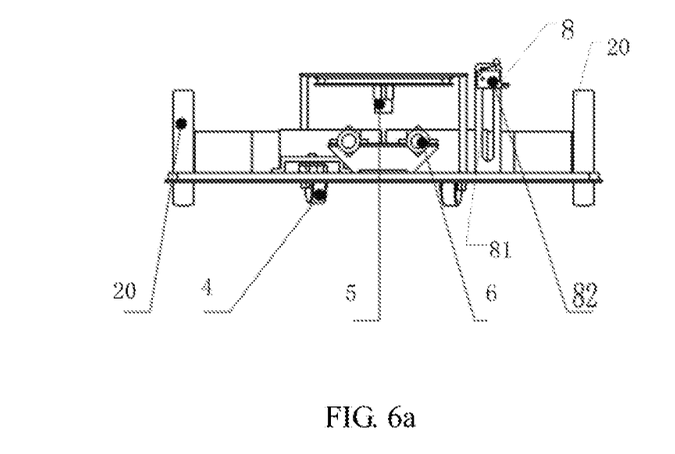
FIG. 6a is a front view of a robot having an auxiliary mechanism according to an embodiment.
Figure 6B:
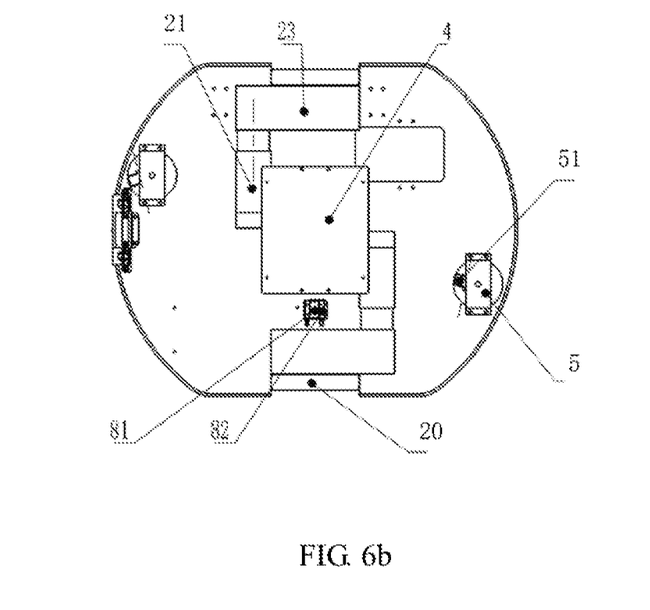
FIG. 6b is a top view of a robot having an auxiliary mechanism according to an embodiment.

Referring to FIGS. 6a and 6b, in an embodiment, the robot further includes an auxiliary mechanism 8, and the auxiliary mechanism 8 and the overturning mechanism are disposed on the same side of the vehicle body. The auxiliary mechanism 8 includes a support rod 81 fixed to the vehicle body 1 and a sensor 82 fixed to the support rod 81. The support rod 81 is configured to assist the overturning mechanism 6 to support the tray 7, so that the tray 7 is more stable when the vehicle body 1 moves. The sensor 82 is configured to detect whether the tray 7 is in the horizontal state. With the support rod and the sensor, the goods transportation is more stable, and the goods are substantially ensured in the horizontal state.

In an embodiment, the robot further includes a fault avoidance mechanism. For example, the fault avoidance mechanism is disposed on two sides of the moving direction of the vehicle body 1. For example, the fault avoidance mechanism is disposed on a front end or a rear end along the moving direction of the vehicle body. For example, the fault avoidance mechanism may be an infrared camera and/or an ultrasonic detector. When an obstacle is detected, the fault avoidance mechanism may send a signal to the controlling mechanism, and the controlling mechanism controls the driving mechanism to stop driving the vehicle body and/or stop the overturning action of the overturning mechanism. The fault avoidance mechanism further may include an alert, when the obstacle is detected, the alert may report an alarm.

The robot provided by this embodiment can be used for assisting goods carrying, increasing the goods carrying efficiency and reducing labor costs.

The above embodiments may be combined with each other and provided with a better effect.

Multiple embodiments of the present disclosure have been described above. The above description is illustrative, and not exhaustive, and the disclosure is limited to the disclosed multiple embodiments. Without departing from the scope and spirit of the described multiple embodiments, various modifications and variations are apparent for those skilled in the art. Therefore, the protection scope of the present disclosure is subject to the protection scope of the claims.

What is claimed is:

1. A self-driven robot, comprising a vehicle body, a driving mechanism, a driven mechanism, a controlling mechanism and an overturning mechanism,
wherein the driving mechanism and the overturning mechanism are disposed on the vehicle body, the driving mechanism comprises a first driving wheel and a second driving wheel and is configured to drive the vehicle body to move, and the controlling mechanism is configured to control the overturning mechanism to overturn when the vehicle body arrives at a specified position,
wherein the driven mechanism comprises a first universal wheel, the first universal wheel, the first driving wheel and the second driving wheel are disposed on a same side of the vehicle body along a direction which is perpendicular to the moving direction of the vehicle body.

2. The self-driven robot of claim 1, wherein the controlling mechanism is further configured to receive an initial drive signal, and control the driving mechanism to drive the vehicle body to the specified position when receiving the initial drive signal.

3. The self-driven robot of claim 1, further comprising a detecting mechanism, wherein the detecting mechanism is configured to detect a position of the vehicle body, and send detected position information to the controlling mechanism, the controlling mechanism is further configured to control the driving mechanism to stop driving the vehicle body when the controlling mechanism receives information that the vehicle body arrives at the specified position.

4. The self-driven robot of claim 3, wherein the detecting mechanism comprises at least one of an infrared sensor, an ultrasonic sensor, or a camera.

5. The self-driven robot of claim 4, wherein the detecting mechanism comprises the camera, wherein the camera is configured to capture images and send captured image information to the controlling mechanism, the controlling mechanism is further configured to compare the captured image information with target image information, when the image information is in accordance with the target image information, the controlling mechanism is configured to control the driving mechanism to stop driving the vehicle body, and control the overturning mechanism to overturn.

6. The self-driven robot of claim 4, wherein the detecting mechanism comprises the camera, and the camera comprises at least one of a two-dimensional code scanning module or a bar code scanning module.

7. The self-driven robot of claim 1, wherein the driving mechanism further comprises a reducer and the driving motor is connected to the driving wheel via the reducer.

8. The self-driven robot of claim 1, wherein the driving mechanism further comprises a first reducer, a second reducer, a first driving motor and a second driving motor, the first driving motor is connected to the first driving wheel via the first reducer, and the second driving motor is connected to the second driving wheel via the second reducer.

9. The self-driven robot of claim 1, wherein the driven mechanism further comprises a second universal wheel, the second universal wheel and the first universal wheel are disposed on the same side of the vehicle body along the direction which is perpendicular to the moving direction of the vehicle body, and the first universal wheel and the second universal wheel are pivotally disposed respectively on the two sides of the vehicle body along the moving direction of the vehicle body.

10. The self-driven robot of claim 9, wherein a first distance between a part of the first universal wheel farthest from the vehicle body and the vehicle body is not equal to a second distance between a part of the second universal wheel farthest from the vehicle body and the vehicle body.

11. The self-driven robot of claim 8, wherein the reducer comprises a synchronous belt or a chain.

12. The self-driven robot of claim 1, wherein a side of the vehicle body is provided with a first mounting base and a second mounting base; the overturning mechanism comprises an overturning motor mounted to the second mounting base, a first crank connected to a first output shaft of the overturning motor, a first connecting rod connected to the first crank via a pin shaft, a rocker rotatably connected to the first mounting base, and a transmission shaft fixedly connected to the rocker;

and wherein the first connecting rod is fixedly connected to the transmission shaft so that the first crank rotates when the overturning motor rotates and drives the first connecting rod to move, the first connecting rod drives the rocker to swing via the transmission shaft.

13. The self-driven robot of claim 12, wherein the overturning mechanism further comprises a second crank connected to a second output shaft of the overturning motor, a second connecting rod connected to the second crank, wherein the second connecting rod is fixedly connected to the transmission shaft.

14. The self-driven robot of claim 13, wherein the first output shaft and the second output shaft are respectively disposed at two sides of the overturning motor.

15. The self-driven robot of claim 14, wherein an end of the first connecting rod away from the first crank has a first shaft hole, an end of the second connecting rod away from the second crank has a second shaft hole, and the transmission shaft is fixedly connected to the first connecting rod and the second connecting rod by passing through the first shaft hole and the second shaft hole.

16. The self-driven robot of claim 1, further comprising a tray connected to the overturning mechanism.

17. The self-driven robot of claim 16, further comprising an auxiliary mechanism, wherein the auxiliary mechanism and the overturning mechanism are disposed on a same side of the vehicle body, the same side is along the direction which is perpendicular to the moving direction of the vehicle body, the auxiliary mechanism comprises a support rod supporting the tray and a sensor fixed to the support rod, and the sensor is configured to detect a horizontal status of the tray.

18. The self-driven robot of claim 1, further comprising a fault avoidance mechanism disposed on the vehicle body, wherein the fault avoidance mechanism is configured to send a signal to the controlling mechanism when an obstacle is detected along a moving direction of the vehicle body, and the controlling mechanism is further configured to control the driving mechanism to stop driving the vehicle body.

19. The self-driven robot of claim 18, wherein the fault avoidance mechanism comprises at least one of an infrared sensor or an ultrasonic sensor.

* * * * *